(12) United States Patent
Lee et al.

(10) Patent No.: US 11,544,541 B2
(45) Date of Patent: Jan. 3, 2023

(54) ARTIFICIAL NEURON DEVICE USING OVONIC THRESHOLD SWITCH, ARTIFICIAL NEURON CHIP AND USER APPARATUS INCLUDING THE SAME

(71) Applicant: KOREA INSTITUTE OF SCIENCE AND TECHNOLOGY, Seoul (KR)

(72) Inventors: Suyoun Lee, Seoul (KR); Joon Young Kwak, Seoul (KR); Hyunsu Ju, Seoul (KR); Byung-Ki Cheong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 774 days.

(21) Appl. No.: 16/526,537

(22) Filed: Jul. 30, 2019

(65) Prior Publication Data
US 2020/0117983 A1   Apr. 16, 2020

(30) Foreign Application Priority Data
Oct. 12, 2018   (KR) .......................... 10-2018-0121698

(51) Int. Cl.
*G06N 3/063*   (2006.01)
*G06N 3/04*   (2006.01)
(52) U.S. Cl.
CPC ............. *G06N 3/063* (2013.01); *G06N 3/049* (2013.01)
(58) Field of Classification Search
CPC ........ G06N 20/00; G06N 3/063; G06N 3/049; G06N 3/02; G06N 3/04; G06N 3/06; G06N 3/0635
See application file for complete search history.

(56) References Cited

U.S. PATENT DOCUMENTS 10,256,271 B1 * 4/2019 Hekmatshoartabari ......................
   H01L 27/2409
2008/0224734 A1 * 9/2008 Lowrey .............. H03K 19/1733
   257/E45.001
2009/0244796 A1 * 10/2009 Tang .................... H01L 27/0251
   361/56
(Continued)

FOREIGN PATENT DOCUMENTS

CN    111383687 A  *  7/2020  ......... G11C 13/0004
CN    114207724 A  *  3/2022  ........... G06N 3/0635
(Continued)

OTHER PUBLICATIONS

Tuma et al., "Stochastic Phase-Change Neurons", May 16, 2016, Nature Nanotechnology, pp. 693-700 (Year: 2016).*
(Continued)

*Primary Examiner* — Paulinho E Smith

(57) ABSTRACT

An artificial neuron device according to an embodiment of the present disclosure includes a first resistor connected between an input terminal and a first node; a capacitor connected between the first node and a ground terminal; a threshold switch connected between the first node and a second node; and a second resistor connected between the second node and the ground terminal, wherein, when an input voltage of a certain level is applied to the input terminal by time, a membrane potential occurs at the first node and a spike current flows through the second node. According to present disclosure, the artificial neuron device expresses the Integrate-and-Fire function, the rate coding ability, the SFA characteristics, and the chaotic activity of the biological neuron, and therefore may be widely used for the artificial neuron network device, the large-scale brain-inspired computing system, and the artificial intelligence (AI) system.

17 Claims, 16 Drawing Sheets

(56) References Cited

U.S. PATENT DOCUMENTS

| | | | |
|---|---|---|---|
| 2015/0055407 A1* | 2/2015 | Mantegazza | G11C 13/0038 365/163 |
| 2019/0147329 A1* | 5/2019 | Hekmatshoartabari | G06N 3/0635 706/26 |
| 2020/0035305 A1* | 1/2020 | Choi | G11C 11/54 |
| 2020/0117983 A1* | 4/2020 | Lee | G06N 3/063 |

FOREIGN PATENT DOCUMENTS

| | | |
|---|---|---|
| KR | 10-2011-0072452 A | 6/2011 |
| KR | 10-2014-0008865 A | 1/2014 |
| WO | WO-9715954 A1 * 5/1997 | ............ G11C 11/56 |
| WO | WO-2019117965 A1 * 6/2019 | |

OTHER PUBLICATIONS

Velea et al., "Te-Based Chalcogenide Materials for Selector Applications", Aug. 14, 2017, Scientific Reports, pp. 1-12 (Year: 2017).*

Lavizzari et al., "A New Transient Model for Recovery and Relaxation Oscillations in Phase-Change Memories", Aug. 2010, IEEE Transactions on Electron Devices, vol. 57 No. 8, pp. 1838-1845 (Year: 2010).*

Lee et al.—"Simple Artificial Neuron Using an Ovonic Threshold Switch Feature Spike-Frequency Adaptation and Chaotic Activity", 2020, Physical Review Applied, pp. 1-9 (Year: 2020).*

Stanford Ovshinsky, "New Transformative Possibilities for Ovonic Devices", pp. 1-9, Jul. 27, 2011, Ovshinsky Innovation LLC, Bloomfield Hills, MI USA.

* cited by examiner

ARTIFICIAL NEURON DEVICE USING OVONIC THRESHOLD SWITCH, ARTIFICIAL NEURON CHIP AND USER APPARATUS INCLUDING THE SAME

CROSS-REFERENCE TO RELATED APPLICATION

This application is based on and claims the benefit of priority to Korean Patent Application No. 10-2018-0121698, filed on Oct. 12, 2018, in the Korean Intellectual Property Office, the disclosure of which is incorporated herein in its entirety by reference.

TECHNICAL FIELD

The present disclosure relates to an artificial neuron circuit, and more particularly, to an artificial neuron device including a ovonic threshold switch, an artificial neuron chip, and a user apparatus.

BACKGROUND

A neuron is a nerve cell that has undergone special differentiation for information processing in vivo. The neuron includes three parts: a soma, an axon, and a dendrite. The axon is a nerve fiber that transmits a signal from the soma to another neuron. The dendrite is a fiber that accepts a signal from another neuron. That is, an end of the axon of another neuron is connected to the dendrite. The connection part is called a synapse.

One neuron receives signals from thousands (on average) to tens of thousands of axons. Therefore, in order to combine one neuron with a plurality of axons, it is necessary to make the dendrite of the neuron complicated and to widen a place where the dendrite is combined with the axons. The soma performs calculations on many input signals, and calculated answers are transmitted to another neuron through the axon. What kind of calculation (or information processing) is to be performed in such a neuron circuit network is dispersed and stored in the connection part of the dendrite, that is, the synapse.

Generally, a potential inside the neuron is lower than the outside. However, when an input signal arrives from the outside, an internal membrane potential gradually increases. When the elevated membrane potential reaches a certain potential, that is, a limit or threshold, the neuron generates a pulse-type current and the membrane potential again lowers. This means that the neuron is fired, which is transmitted as an electrical signal to another neuron.

An artificial neural circuit is a circuit that performs an operation similar to a biological nerve system. The artificial neural circuit may be used in various fields such as character recognition, image recognition, speech recognition, and face recognition. The artificial neural circuit may be implemented in a circuit using a technique such as Very Large Scale Integrated Circuits (VLSI), to a certain degree. However, it is not easy to implement complex characteristics and behavior of the biological nerve system in a circuit by the conventional method. In addition, in order to implement the artificial neural circuit using the conventional method, an area of the artificial neural circuit is widened and electric power is consumed despite being implemented in the circuit.

The present disclosure has been made to solve the above-mentioned technical problems, and it is an object of the present disclosure to provide an artificial neuron device, which satisfies characteristics and behavior of a biological neuron and has a very simple structure, thereby high density and low power consumption. It is also an object of the present disclosure to provide an artificial neuron chip including such an artificial neuron device. It is also an object of the present disclosure to provide a user apparatus including such an artificial neuron chip.

SUMMARY

An artificial neuron device according to an embodiment of the present disclosure includes a first resistor connected between an input terminal and a first node; a capacitor connected between the first node and a ground terminal; a threshold switch connected between the first node and a second node; and a second resistor connected between the second node and the ground terminal, wherein, when an input voltage of a constant level is applied to the input terminal according to time, a membrane potential occurs at the first node and a spike current flows through the second node.

In an embodiment, when the level of the input voltage applied to the input terminal increases, a region, where a spike frequency of the spike current flowing through the second node increases, may occur. When the level of the input voltage applied to the input terminal is constant, an SFA region, where an inter-spike interval of the spike current flowing through the second node increases, may exist.

When the level of the input voltage applied to the input terminal is constant, an irregular region, where the inter-spike interval of the spike current flowing through the second node has deterministic nonlinear characteristics, may exist. Relative weight of the SFA region and the irregular region may change depending on the values of the first and second resistors and the capacitor. The artificial neuron may have a chaotic activity property in the irregular region.

In another embodiment, the threshold switch may include an ovonic threshold switch (OTS). The threshold switch may include a top electrode, a TS material, and a bottom electrode. The TS material may include an oxide including at least one of Nb, Ta, and V. The TS material may include a compound including at least one of Se and Te, and at least one of Si, Ge, and As. The threshold switch may have an on-resistance state or an off-resistance state depending on a threshold voltage (Vth), a holding voltage (Vh), and a previous resistance state.

An artificial neuron chip according to an embodiment of the present disclosure includes first and second artificial neuron devices; and an artificial synapse transmitting an electric signal generated at the first artificial neuron to the second artificial neuron device, wherein, the first artificial neuron device includes a first resistor connected between an input terminal and a first node; a capacitor connected between the first node and a ground terminal; a threshold switch connected between the first node and a second node; and a second resistor connected between the second node and the ground terminal, wherein, when an input voltage of a constant level is applied to the input terminal according to time, a membrane potential may occur at the first node and a spike current flowing through the second node may be provided as the electric signal to the artificial synapse.

In an embodiment, when the level of the input voltage applied to the input terminal increases, a region, where a spike frequency of the spike current flowing through the second node increases, may occur. When the level of the input voltage applied to the input terminal is constant, an SFA region, where an inter-spike interval of the spike current flowing through the second node increases, may exist. When the level of the input voltage applied to the input terminal is constant, an irregular region, where the inter-spike interval of the spike current flowing through the second node has deterministic nonlinear characteristics, may exist. The first artificial neuron may have a chaotic activity property in the irregular region.

A user apparatus according to an embodiment of the present disclosure may include the artificial neuron chip; a control unit controlling an operation of the artificial neuron chip; and a power source unit providing power to the artificial neuron chip and the control unit.

In an embodiment, when the level of the input voltage applied to the input terminal increases, a region, where a spike frequency of the spike current flowing through the second node increases, may occur. When the level of the input voltage applied to the input terminal is constant, an SFA region, where an inter-spike interval of the spike current flowing through the second node increases, may exist. When the level of the input voltage applied to the input terminal is constant, an irregular region, where the inter-spike interval of the spike current flowing through the second node has deterministic nonlinear characteristics, may exist.

According to the embodiments of the present disclosure, the artificial neuron device expresses the Integrate-and-Fire function, the rate coding ability, the SFA characteristics, and the chaotic activity of the biological neuron, and therefore may be widely used for the artificial neuron network device, the large-scale brain-inspired computing system, and the artificial intelligence (AI) system. In addition, since the artificial neuron device according to the embodiments of the present disclosure is designed to include the threshold switch and a small number of passive elements, power consumption may be remarkably reduced compared to the conventional artificial neuron device based on Si-MOSFET.

DETAILED DESCRIPTION

Hereinafter, embodiments of the present disclosure will be described clearly and in detail so that those skilled in the art can easily carry out the present disclosure.

I. Stimulus and Response in Biological Neuron

Figure 1A:
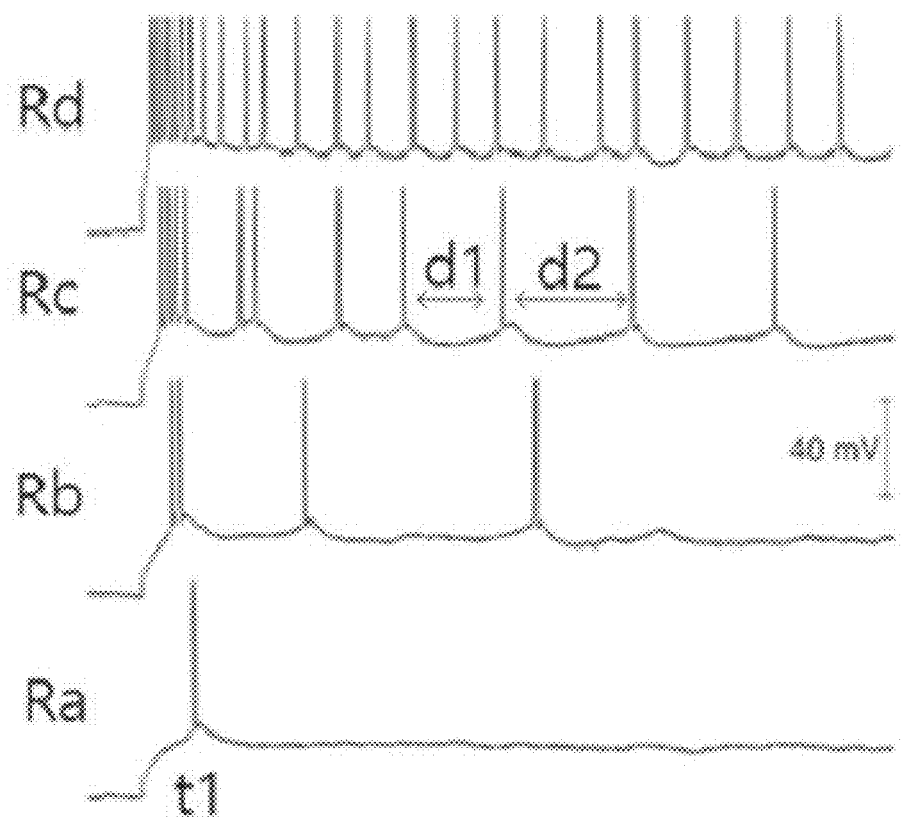
FIGS. 1A to 1C are graphs illustrating stimuli and responses in a biological neuron.
Figure 1A:
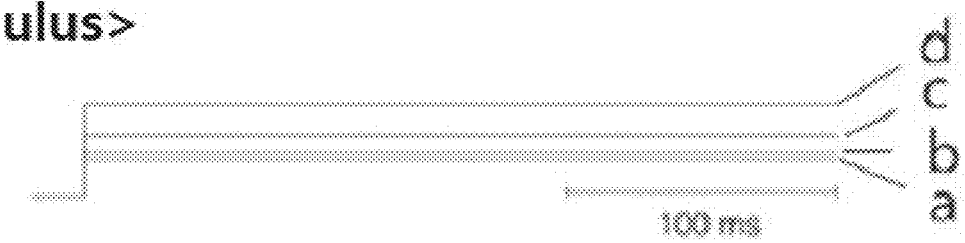
Figure 1B:
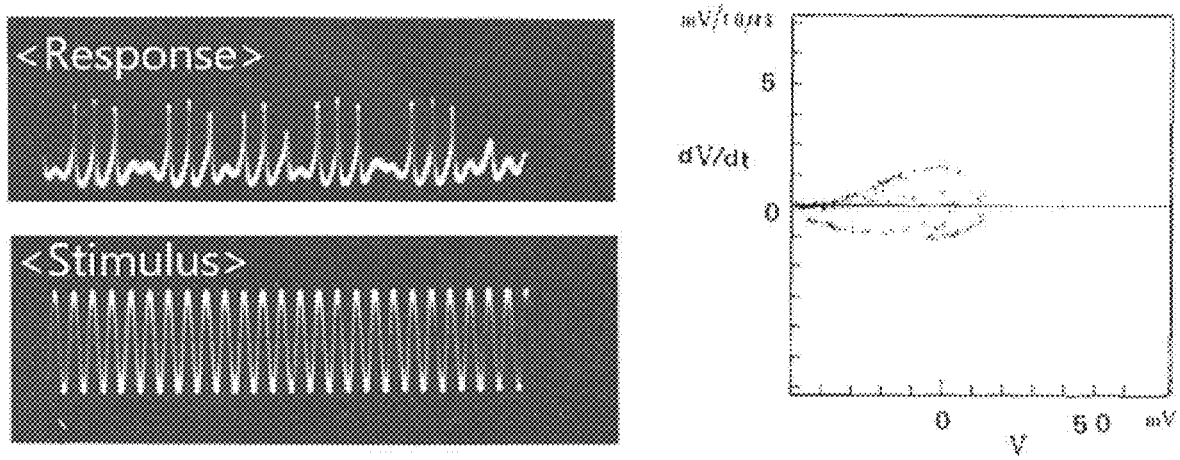
Figure 1C:
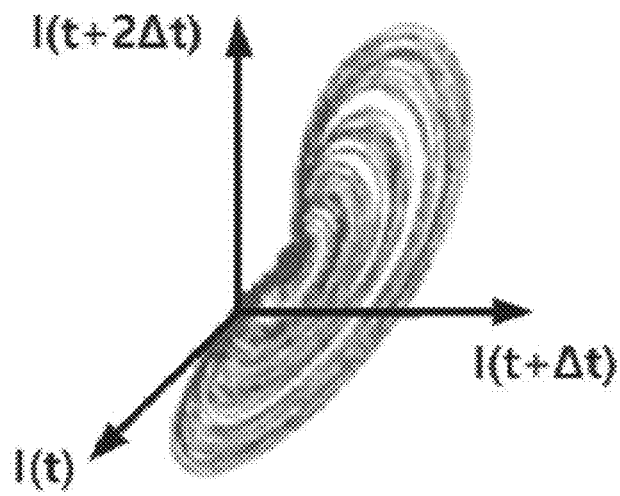

FIGS. 1A to 1C are graphs illustrating stimuli and responses in a biological neuron. FIG. 1A exemplarily illustrates responses and stimuli expressed in a neuron existing in an ophthalmic nerve of a locust. Referring to FIG. 1A, the biological neuron shows a constant response pattern tendency to the stimuli. When the constant stimulus is applied to the biology neuron by time, a membrane potential (Vmem) increases. When the membrane potential (Vmem) increases and is beyond threshold, the neuron generates a spike current (Is). FIG. 1A shows a change of the spike current (Is) in the responses to various intensities of the stimuli.

For example, when a certain level of an a-stimulus is applied to the biological neuron, the membrane potential (Vmem) increases to a t1 point and the spike current (Is) occurs at the t1 point. This response pattern of the neuron is named an Integrate-and-Fire. The biological neuron, generally, has an Integrate-and-Fire function (I&F function). As the intensities of the stimuli increase in the biological neuron, a spike rate gradually increases. Here, the spike rate is also known as a firing rate. Referring to FIG. 1A, as the intensities of the stimuli increase from the a-stimulus toward a b-stimulus, a c-stimulus, and a d-stimulus, the number of spikes occurring in the biological neuron increases.

For example, one spike occurs for the a-stimulus, four spikes occur for the b-stimulus, and more spikes occur for the c-stimulus and d-stimulus. A response of the biological neuron, in which the spike rate increases as the intensities of the stimuli, is named a rate coding. The biological neuron, generally, has a rate coding ability.

Also, the biological neuron has response characteristics, in which the spike rate gradually decreases with respect to one constant stimulus as time goes by. That is, a time interval between the spikes in the biological neuron becomes larger by time. For example, a response Rc to the c-stimulus of FIG. 1A shows a time interval d2 becomes larger than a time interval d1. A response of the biological neuron, in which the spike time interval gradually increases with respect to one constant stimulus, is named a Spike-Frequency-Adaptation (SFA). The biological neuron generally has an SFA property.

As discussed above, the biological neuron has the Integrate-and-Fire function, the rate coding ability, and the SFA property. Also, the biological neuron may have a chaotic activity as illustrated in FIGS. 1B and 1C.

FIG. 1B shows a stimulus and a response in a squid giant axon. Referring to a left graph of FIG. 1B, the stimulus having a sine wave shape is input to the squid giant axon, the response to the stimulus does not have a regular pattern and is erratic. Here, the irregular response may be a deterministic nonlinear response that is expressed as a differential equation function. For example, a right view of FIG. 1B is a graph of dV/dt with respect to a response voltage V and illustrates the chaotic activity of the biological neuron.

FIG. 1C is a graph illustrating a neuron activity of a hippocampal CA3 region in a rat's brain. Referring to FIG. 1C, x, y, and z axes represent I(t), I(t+Δt), and I(t+2Δt), respectively, and FIG. 1C is a three-dimensional graph that shows a current flowing through the neuron at three-points. FIG. 1C shows that the neuron of the hippocampal CA3 region in the rat's brain has the deterministic nonlinear response. Namely, FIG. 1C shows the chaotic activity of the biological neuron.

As mentioned above, the SFA property and the chaotic activity are more evident in a neuron present in the mammalian cortex. The above biological neuron has complex and delicate characteristics, and therefore it is not easy to make an artificial neuron device which meets all the characteristics of the biological neuron, or to make an artificial neuron network chip including the artificial neuron device. However, the artificial neuron device described below may satisfy the various characteristics of the biological neuron described above.

II. Structure and Operation of Artificial Neuron

Figure 2A:
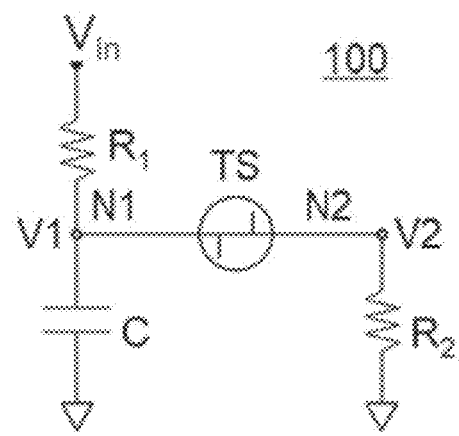
FIGS. 2A and 2B are circuit diagrams illustrating an artificial neuron device according to an embodiment of the present disclosure.
Figure 2B:
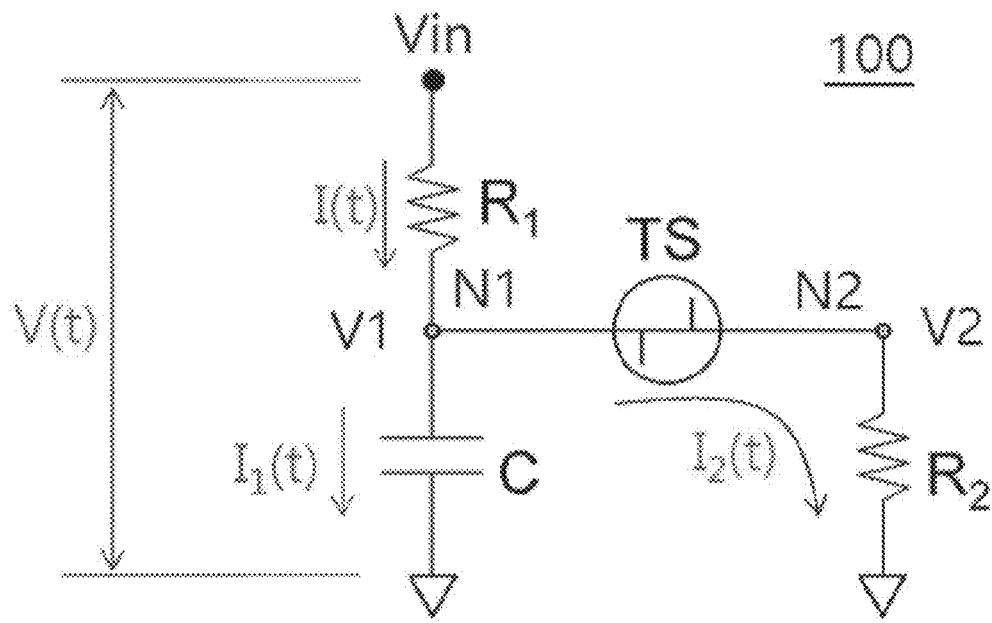

FIGS. 2A and 2B are circuit diagrams illustrating an artificial neuron device according to an embodiment of the present disclosure. The artificial neuron device 100 shows of the stimulus and the response characteristics of the biological neuron as shown in FIGS. 1A to 1C. Therefore, the artificial neuron device 100 may be used in a large-scale brain-inspired computing system or an artificial intelligence (AI) system.

Referring to FIG. 2A, the artificial neuron device 100 may include a threshold switch TS and a plurality of passive elements, thereby being implemented. The passive elements may include a first resistor R1, a second resistor R2, and a capacitor C. Referring to FIG. 2A, the first resistor R1 is connected between an input terminal and a first node N1. The input terminal receives an input voltage Vin. The capacitor C is connected between the first node N1 and a ground terminal. The threshold switch TS is connected between the first node N1 and a second node N2. The second resistor R2 is connected the second node N2 and the ground terminal. The second resistor R2 may be an equivalent resistance of an external device viewed from the threshold switch TS. A second current I2 flowing through the second resistor R2 may be an output current.

Referring FIG. 2B, when a voltage between the input terminal and the ground terminal by time is named a V(t), an input current flowing through the first resistor R1 is named I(t), a first current flowing through the capacitor C is named $I_1(t)$, and a second current flowing through the threshold switch TS and the second resistor R2 is named $I_2(t)$, an input current I may be expressed as the sum of the first current $I_1$ and the second current $I_2$, as shown in Equation 1 below.

$$I(t) = I_1(t) + I_2(t) \qquad [\text{Equation 1}]$$

A voltage V between the input terminal and the ground terminal may be expressed as the sum of a voltage $R_1 I$ applied to the first resistor R1 and a first node voltage V1. Here, the first node voltage V1 may be expressed as a voltage applied to the capacitor C. Therefore, an input voltage Vin may be expressed as shown in Equation 2 below.

$$V(t) = R_1 I(t) + \frac{1}{C}\int I_1(t)dt \qquad [\text{Equation 2}]$$

The first node voltage V1 may be expressed as the sum of a voltage $V_{TS}$ applied to the threshold switch TS and a second node voltage V2. The second node voltage V2 is a voltage $R_2 I_2$ applied to the second resistor R2. When a resistance of the threshold switch TS is named $R_{TS}$, the voltage $V_{TS}$ of the threshold switch TS may be expressed by a voltage dividing rule, as shown in Equation 3 below.

$$V_{TS}(t) = \frac{R_{TS}}{R_{TS} + R_2} \frac{1}{C}\int I_1(t)dt \qquad [\text{Equation 3}]$$

Here, the $R_{TS}$ may be defined as a resistance of a variable resistor, which changes depending on a bias voltage applied to the threshold switch TS or a previous state of the threshold switch TS. The $R_{TS}$ may be expressed as shown in Equation 4 below.

$$R_{TS}(V_{th}, V_H, t, t-\delta) = \qquad [\text{Equation 4}]$$
$$\begin{cases} R_{on} & \text{for } V_{TS} > V_{th} \\ R_{on} & \text{for } V_H < V_{TS} < V_{th} \text{ and } R_{TS}(t-\delta) = R_{on} \\ R_{off} & \text{for } V_{TS} < V_H \\ R_{off} & \text{for } V_H < V_{TS} < V_{th} \text{ and } R_{TS}(t-\delta) = R_{off} \end{cases}$$

Referring to Equation 4, the resistance state of the $R_{TS}$ changes depending on a $V_{th}$ and a $V_h$. Here, the $V_{th}$ is a threshold voltage of the threshold switch TS and the $V_h$ is a holding voltage of the threshold switch TS. When the $V_{TS}$ is higher than the $V_{th}$, the threshold switch TS is in an on-resistance-state $R_{on}$. When the $V_{TS}$ is lower than the $V_h$, the threshold switch TS is in an off-resistance-state $R_{off}$.

The resistance state of the $R_{TS}$ may change depending on the previous resistance state. When the $V_{TS}$ is higher than the $V_h$ and is lower than the $V_{th}$ ($V_h < V_{TS} < V_{th}$), the previous resistance state is maintained. Namely, when the previous resistance state of the threshold switch TS is the on-resistance-state $R_{on}$, the threshold switch TS maintains the on-resistance-state $R_{on}$, and when the previous resistance state of the threshold switch TS is the off-resistance-state $R_{off}$, the threshold switch TS maintains the off-resistance-state $R_{off}$. The threshold switch resistance $R_{TS}$ expressed in Equation 4 is due to material characteristics of the threshold switch TS and a voltage-current change of the threshold switch TS. The voltage-current change of the threshold switch TS will be described in more detail with reference to FIG. 3.

Figure 3:
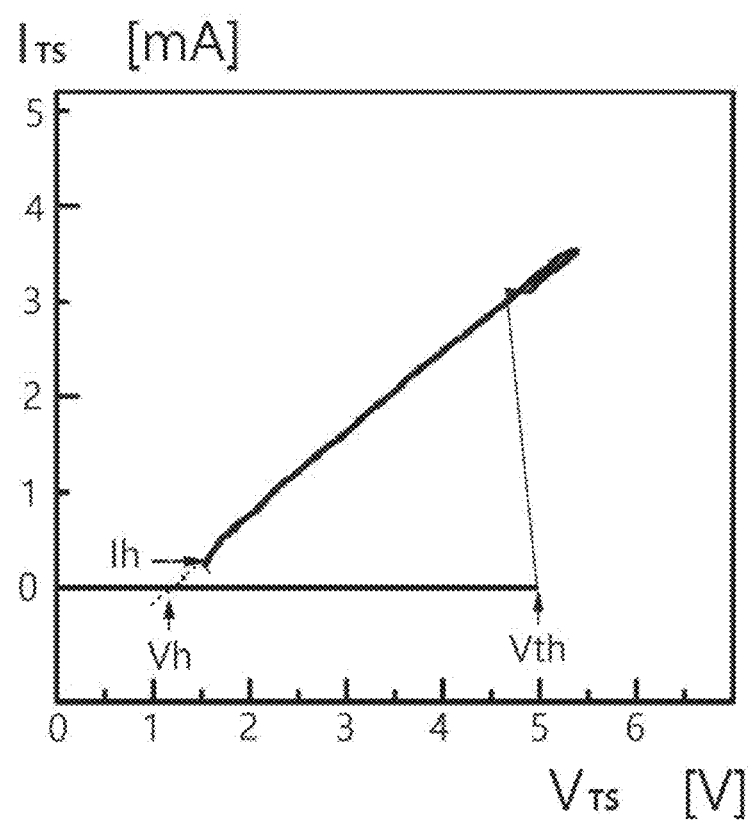
FIG. 3 is a graph exemplarily illustrating a voltage-current change of the threshold switch of the artificial neuron device shown in FIG. 2.

FIG. 3 is a graph exemplarily illustrating a voltage-current change of the threshold switch TS of the artificial neuron device shown in FIG. 2. In FIG. 3, a horizontal axis represents a voltage $V_{TS}$ applied to the threshold switch TS and a vertical axis represents a current $I_{TS}$ flowing through the threshold switch TS.

Referring to FIG. 3, when the TS voltage $V_{TS}$ is lower than the threshold voltage $V_{th}$, the threshold switch TS is in a non-conductive state. A current does not flow in the threshold switch TS. In an example of FIG. 3, the current does not flow in the threshold switch TS before the TS voltage $V_{TS}$ reaches about 5V. The threshold switch TS is in the non-conductive state, that is, the off-resistance state $R_{off}$. When the TS voltage $V_{TS}$ reaches the threshold voltage $V_{th}$ (about 5V), the threshold switch TS is in a conductive state. The current flowing in the threshold switch TS increases sharply. The threshold switch TS changes to a conductive state in which the $I_{TS}$ increases sharply, that is, the on-resistance state $R_{on}$.

In the on-resistance state $R_{on}$, when the $V_{TS}$ becomes lower, the $I_{TS}$ starts to decrease linearly. When the $I_{TS}$ decreases and reaches a holding current $I_h$, the threshold switch TS changes to the off-resistance state $R_{off}$ again. That is, when the $V_{TS}$ becomes the holding voltage $V_h$ (about 1V), the threshold switch TS changes to the non-conductive state, that is, the off-resistance state $R_{off}$ again. Thus, the threshold switch TS changes from the off-resistance state $R_{off}$ to the on-resistance state $R_{on}$ depending on the $V_{TS}$. Otherwise, the threshold switch TS changes from the on-resistance state $R_{on}$ to the off-resistance state $R_{off}$.

Figure 4:
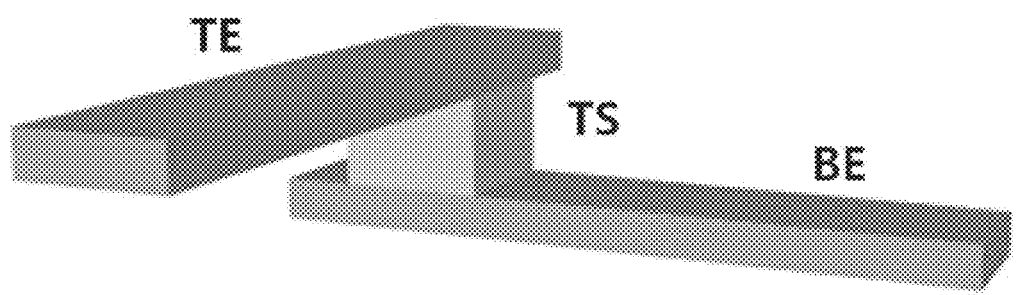
FIG. 4 is a block diagram exemplarily illustrating a structure of the threshold switch shown in FIG. 2.

FIG. 4 is a block diagram exemplarily illustrating a structure of the threshold switch TS shown in FIG. 2. Referring to FIG. 4, the threshold switch TS may have a cross-point structure including a top electrode TE, a threshold switch material TS, and a bottom electrode BE.

A conductive material or a semiconductive material may be used for the top and bottom electrodes TE, BE. A Ge—Se—Te compound, a Si—Se—Te compound, a Si—As—Te—Ge—P compound, a Nb—Ta—O compound, a Mo—W—O compound, and the like may be used for the material of the threshold switch TS having the current-voltage characteristics shown in FIG. 3. For example, the threshold switch TS material may be an oxide (e.g. $Nb_2O_5$) including at least one of Nb, Ta, and V, a compound (e.g., $Ge_{60}Se_{40}$) including at least one of Se and Te and at least one of Si, Ge and As. Also, the TS material may be an ovonic threshold switch (OTS).

The top and bottom electrodes TE, BE of the threshold switch TS and the threshold switch material TS may be fabricated by a photolithography and a lift-off technique. The bottom electrode BE, the threshold switch material TS, and the top electrode TE may be deposited using an RF magnetron-sputtering technique, each having a film thickness of about 100 nm.

Figure 5:
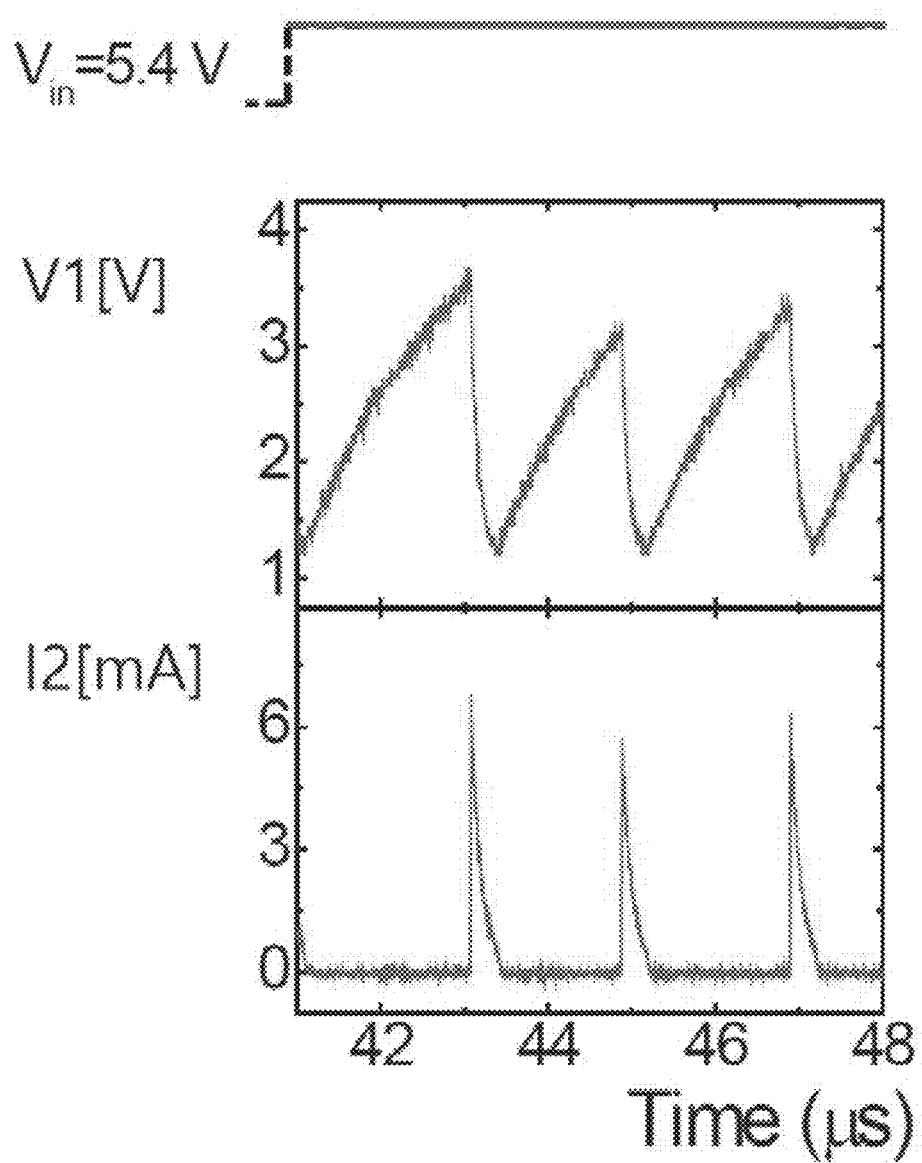
FIG. 5 is a graph exemplarily illustrating an Integrate-and-Fire function of the artificial neuron device shown in FIG. 2.

FIG. 5 is a graph exemplarily illustrating an Integrate-and-Fire function of the artificial neuron device shown in FIG. 2. FIG. 5 shows experimental results when R1=10 KΩ, R2=100 KΩ, and C=10 pF in the artificial neuron device 100 of FIG. 2.

Referring to FIG. 5, an input voltage Vin of about 5.4 V is applied to the input terminal. The input voltage Vin is a square pulse and a DC voltage of about 5.4 V. When the artificial neuron device 100 receives the input voltage Vin of about 5.4 V, the artificial neuron device 100 expresses characteristics similar to the membrane potential and the spike current of the biological neuron.

When the DC voltage of about 5.4 V is applied to the input terminal of the artificial neuron device 100, the voltage V1 applied to the capacitor C increases. The first node voltage V1 may increase depending on an integral function as shown in Equation 2. The first node voltage V1 may continue to increase until the first node voltage V1 reaches about 3.5V, which is the threshold voltage $V_{th}$ of the TS.

When the first node voltage V1 reaches about 3.5V, the threshold switch TS changes to the on-resistance state $R_{on}$ and the second current I2 abruptly increases. As shown in FIG. 5, the artificial neuron device 100 generates a first spike current Is at about 43 μs. After the first spike current Is occurs, the first node voltage V1 falls to the holding voltage $V_h$, and threshold switch TS changes to the off-resistance state $R_{off}$. The first node voltage V1 increases to about 3V, and the threshold switch TS becomes the on-resistance state $R_{on}$. The artificial neuron device 100 generates a second spike current Is at about 45 μs. The artificial neuron device 100 may repeatedly generate the spike current Is while repeating the above operation.

In the artificial neuron device 100 according to an embodiment of the present disclosure, the first node voltage V1 corresponds to the membrane potential of the biological neuron, the second current I2 corresponds to the spike current. Similar to the biological neuron, the artificial neuron device 100 may generate the spike current when the first node voltage V1 increases and the threshold switch TS reaches the threshold voltage $V_{th}$. That is, the artificial neuron device 100 may perform the Integrate-and-Fire function as seen in the biological neuron.

Figure 6:
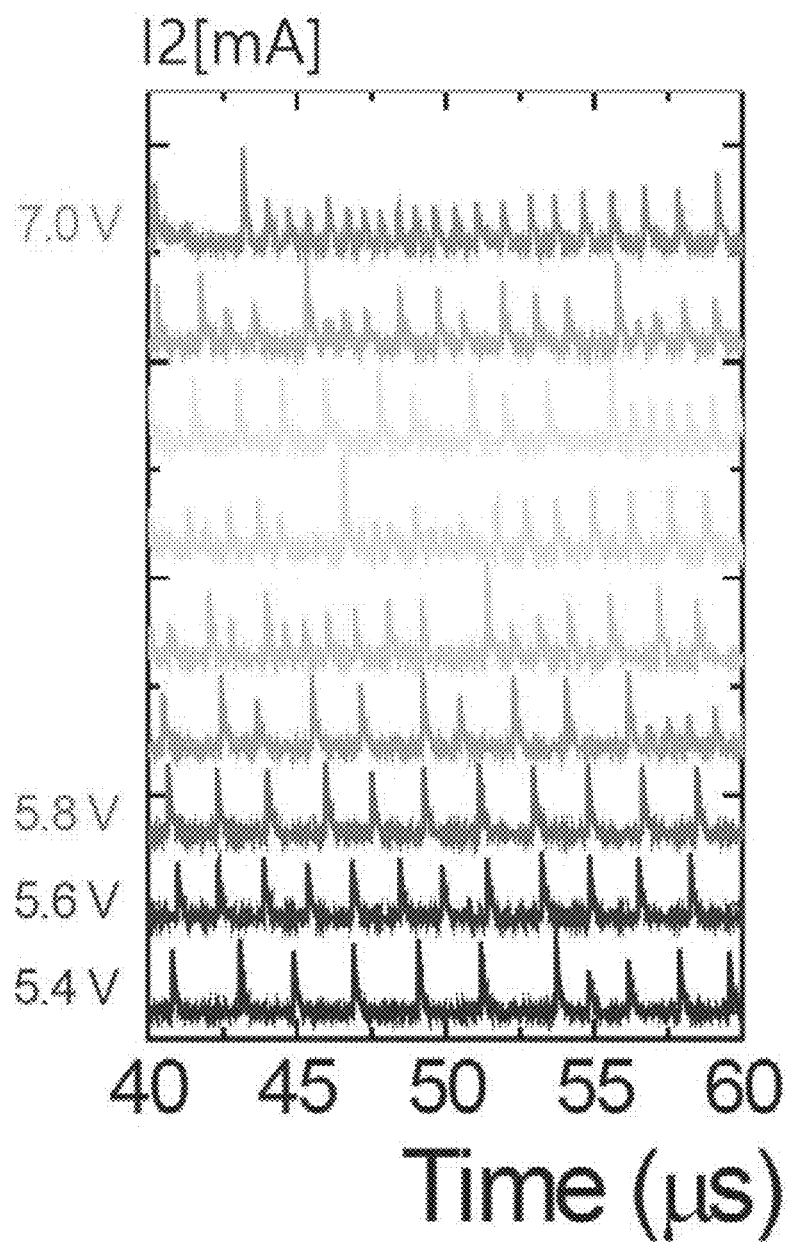
FIG. 6 and FIG. 7 are graphs illustrating a rate coding ability of the artificial neuron device shown in FIG. 2.
Figure 7:
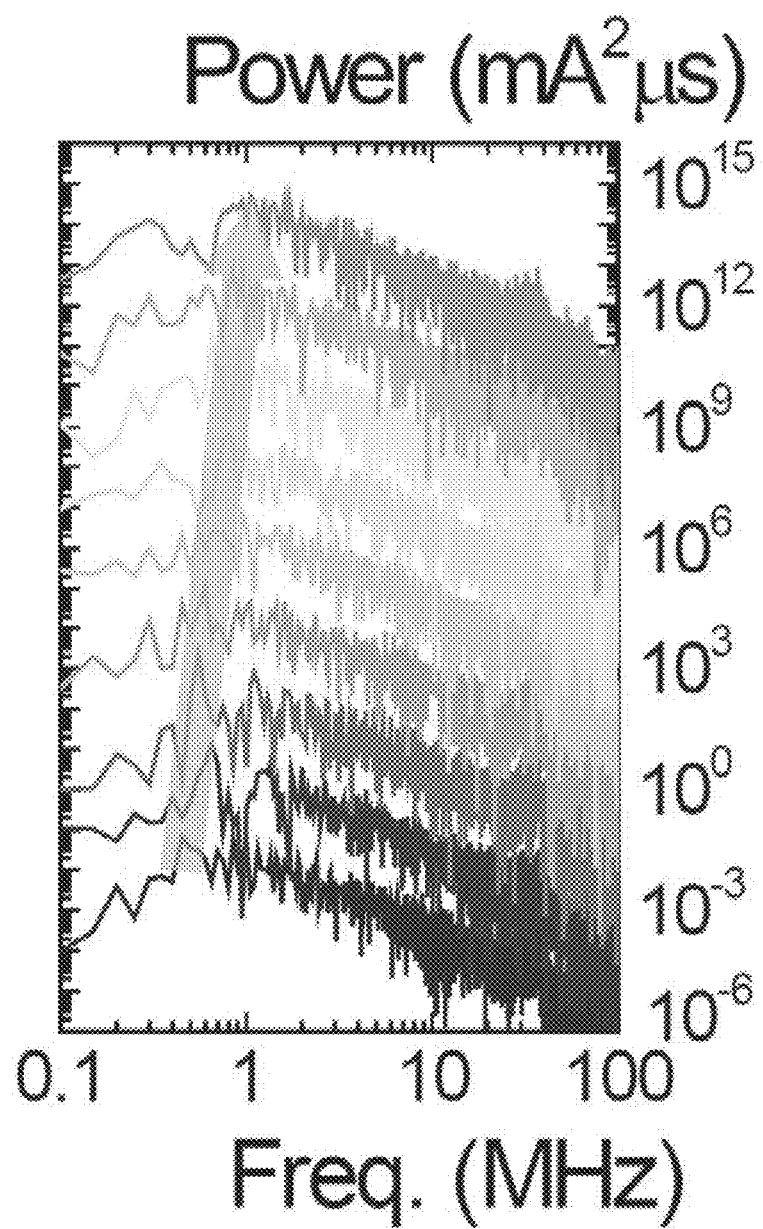

FIG. 6 and FIG. 7 are graphs illustrating a rate coding ability of the artificial neuron device shown in FIG. 2. FIG. 6 shows a change of the spike current depending on a change of the input voltage Vin of the artificial neuron device 100, and FIG. 7 shows a power density spectrum of the spike current depending on the change of the input voltage Vin.

Referring to FIG. 6, in a change of the second current I2 with respect to each input voltage Vin over time, when the input voltage Vin increases by 0.2V from 5.4V to 7.0V, a spike frequency increases. Here, an increase of the input voltage Vin may correspond to an increase of intensities of the stimuli of the biological neuron, that is, from a toward b, c, and d shown in FIG. 1A. Whenever the input voltage Vin of the artificial neuron device 100 increases by 0.2 V, the increase of the spike frequency of the second current I2 may correspond to the increase of the spike rate as the intensities of the stimuli of the biological neuron shown in FIG. 1A increase. That is, the artificial neuron device 100 shown in FIG. 2 also generates the rate coding ability of the biological neuron.

In FIG. 7, a horizontal axis represents a frequency and a vertical axis represents a power density spectrum. In FIG. 7, in a change of a power density depending on the frequency with respect to each input voltage Vin, when the input voltage Vin increases by 0.2V from 5.4V to 7.0V, a peak position of the power density is shifted toward a high frequency. The power density spectrum of FIG. 7 also shows that the artificial neuron device 100 illustrated in FIG. 2 has the rate coding ability seen in the biological neuron.

Figure 8A:
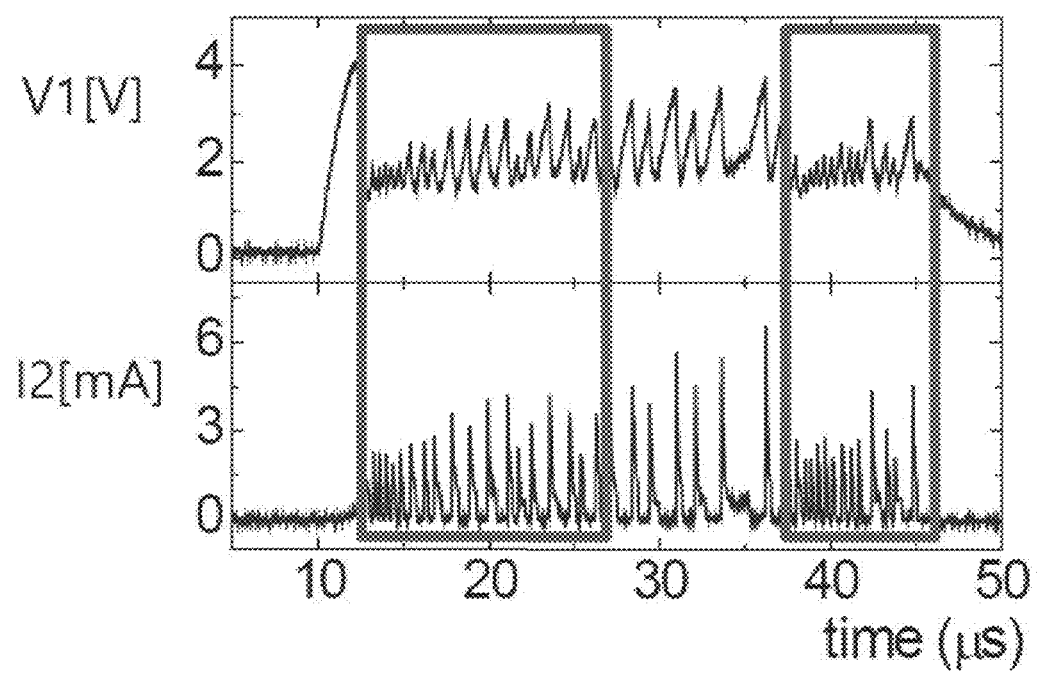
FIGS. 8A to 8C are graphs illustrating Spike-Frequency-Adaptation (SFA) characteristics of the artificial neuron device shown in FIG. 2.
Figure 8B:
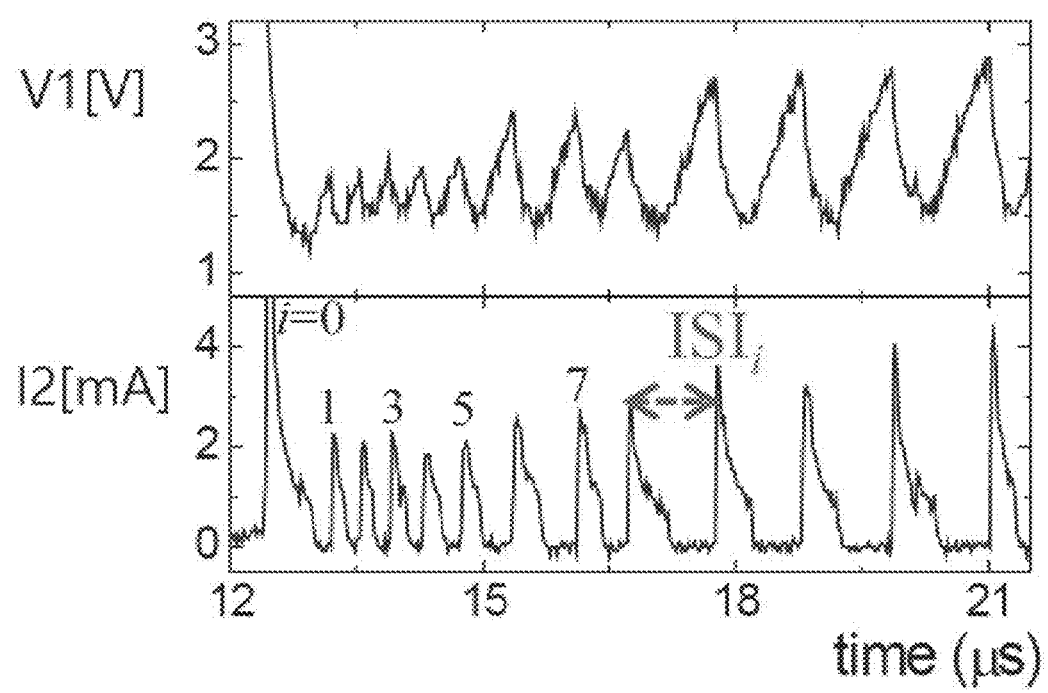
Figure 8C:
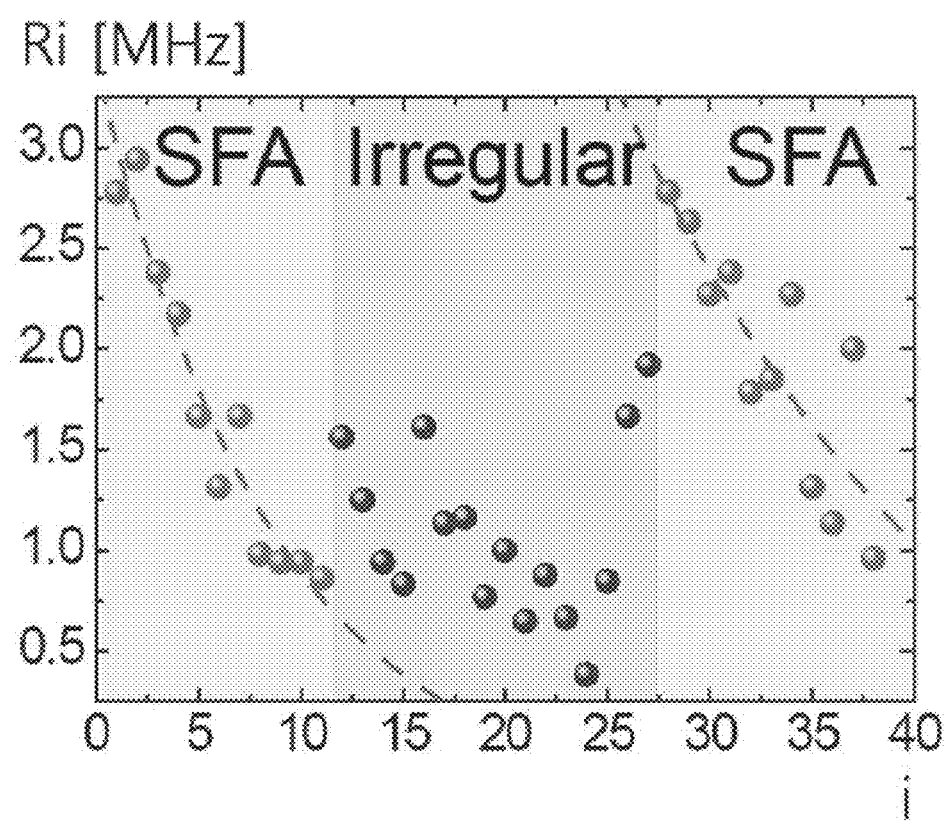

FIGS. 8A to 8C are graphs illustrating Spike-Frequency-Adaptation (SFA) characteristics of the artificial neuron device shown in FIG. 2. As shown in FIG. 1A, the biological neuron expresses characteristics, in which the spike frequency gradually decreases for a constant stimulus as time goes by. The Spike-Frequency-Adaptation (SFA) characteristics is common in mammalian excitatory neurons. The artificial neuron device 100 of the present disclosure may have the Spike-Frequency-Adaptation (SFA) characteristics of the biological neuron.

FIG. 8A is a graph showing results of measuring the first node voltage V1 and the second current I2, where R1=10 KΩ, R2=100 KΩ and C=10 pF at the passive element of the artificial neuron device 100 of FIG. 2. An upper graph in FIG. 8A shows a change of the first node voltage V1 depending on time and a lower graph of FIG. 8A shows a change of the second current I2 depending on time. Referring to a box portion of FIG. 8A, as time goes by, the spike frequency of the second current I2 gradually decreases. That is, the interval between the spikes gradually increases in the artificial neuron device 100 of FIG. 2 as time goes by.

FIG. 8B is an enlarged graph of changes in the first node voltage V1 and the second current I2 between 12 μs and 21 μs of FIG. 8A. In FIG. 8B, an i denotes a spike count, and ISI (inter-spike interval) denotes an interval between an i-1 spike and an i-th spike. For example, $ISI_9$ represents a time interval between an eighth spike and a ninth spike. Referring to FIG. 8B, the inter-spike interval $ISI_i$ gradually increases as the spike count i increases.

FIG. 8C is a graph showing a spike rate Ri depending on the spike count i of the artificial neuron device 100 shown in FIG. 2. In FIG. 8C, a horizontal axis represents the spike count i, and a vertical axis represents the spike rate Ri. Referring to FIG. 8C, the artificial neuron device 100 has a Spike-Frequency-Adaptation region (SFA region) and an irregular region depending on the spike count i. For example, the SFA characteristics is shown in a spike count i range of 1-12, the irregular spike rate is shown in a spike count i range of 13-27, the SFA characteristics is shown in a spike count i range of 28-40. The spike rate Ri shown in the SFA region may be expressed by an exponential function as shown in Equation 5 below.

$$R(i)=R0+R1\exp(-i/\alpha) \quad \text{[Equation 5]}$$

Here, a R0, a R1, and a α are constants, respectively. The artificial neuron device 100 has the spike rate that exponentially decreases in a certain range of the spike counts i. Also, the artificial neuron device 100 has the irregular region of the spike rate Ri in a certain range of the spike counts i. That is, the artificial neuron device 100 may have both the SFA region and the irregular region. Relative weight of the SFA region and the irregular region may change depending on the values of the first and second resistors R1 and R2 and the capacitor C. The irregular region shown in the artificial neuron device 100 may be expressed as the chaotic activity in the biological neuron.

Figure 9A:
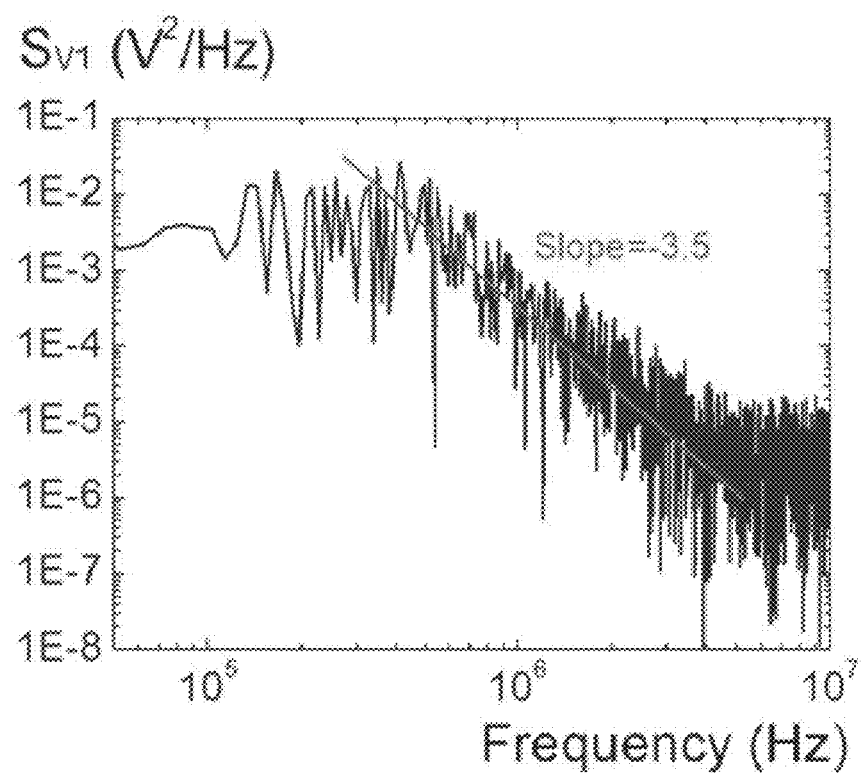
FIGS. 9A to 9C are graphs experimentally illustrating a chaotic activity of the artificial neuron device shown in FIG. 2. FIG.
Figure 9B:
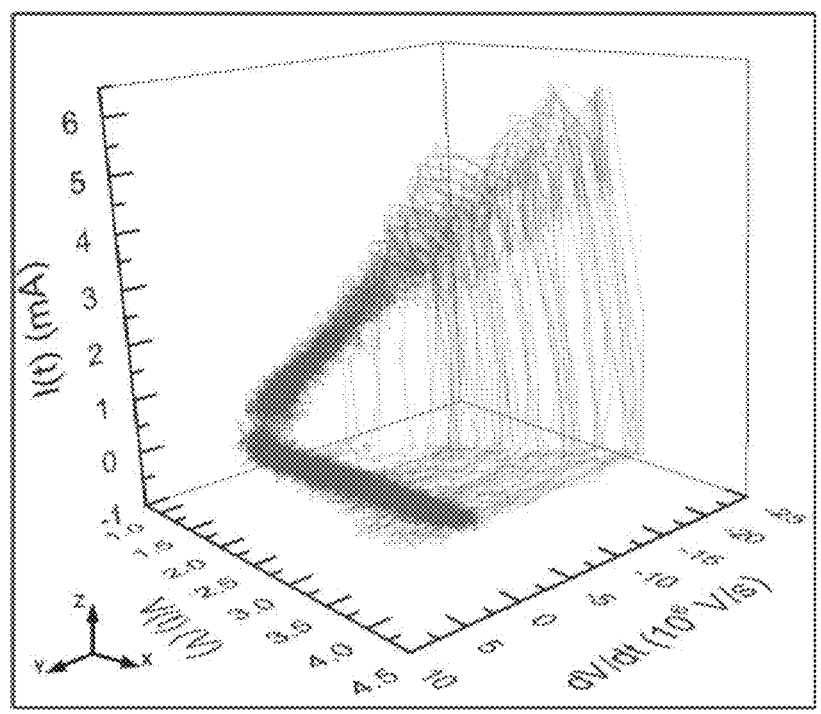
Figure 9C:
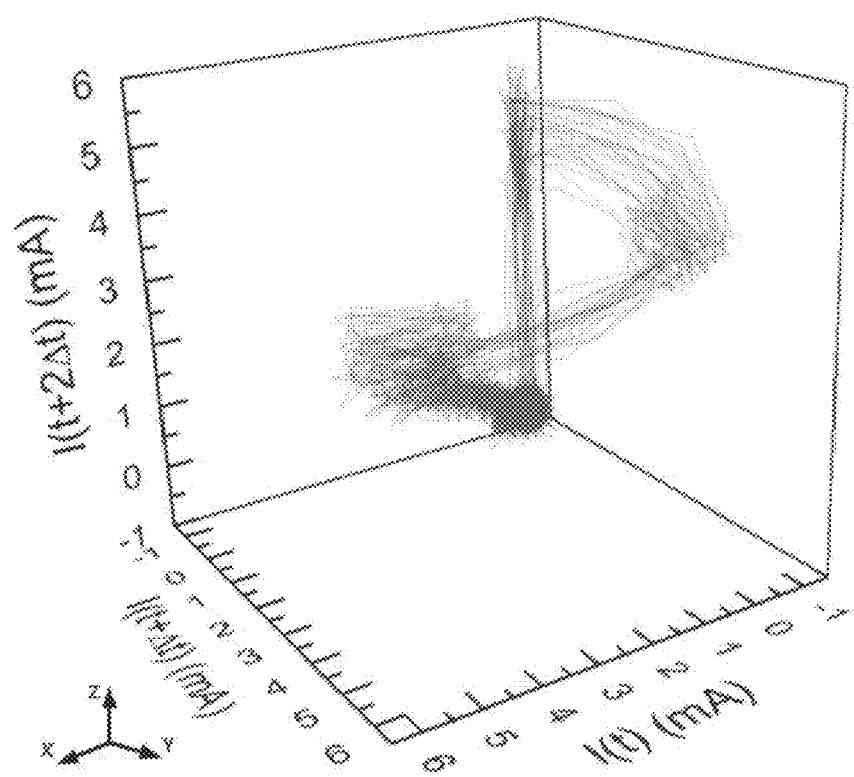

FIGS. 9A to 9C are graphs experimentally illustrating a chaotic activity of the artificial neuron device shown in FIG. 2. FIG. FIG. 9A is a graph illustrating a power density spectrum of the first node voltage V1 obtained through a Fast Fourier Transform (FFT) when R1=5 KΩ, R2=100Ω, and C=2 pF in the passive element of the artificial neuron device 100. A horizontal axis represents a frequency and a vertical axis represents a power density SV1 of the first node voltage V1.

The graph characteristics of the artificial neuron device 100 shown in FIG. 9A are similar to the response characteristics of the squid giant axon described in FIG. 1B. However, a frequency range of the artificial neuron device 100 is experimentally much larger (for example, about 104 times) than that of the squid giant axon, and a decay slope is slightly steeper than that of the squid giant axon.

FIG. 9B is a graph illustrating dV/dt with respect to the first node voltage V of the artificial neuron device 100, which shows the response similar to the deterministic non-linear of the squid giant axon shown in FIG. 1B. In FIG. 9B, an X-axis represents the first node voltage V1, a Y-axis represents a dV/dt, and a Z-axis represents the second current I2. In detail, in an X-Y plane in FIG. 9B, the artificial neuron device 100 shows the chaotic activity similar to the deterministic nonlinear of the squid giant axon shown in FIG. 1B.

FIG. 9C is a graph illustrating the deterministic nonlinear characteristics of the artificial neuron device 100, which shows a similar response to the neuron activity of the hippocampal CA3 region in the rat's brain shown in FIG. 1C. Referring to FIG. 9C, x, y, and z axes represent I(t), I(t+Δt), and I(t+2Δt), respectively, and FIG. 9C is a three-dimensional graph that shows a current flowing through the artificial neuron device 100 at three-points. Referring to FIG. 9C, the artificial neuron device 100 shows the deterministic nonlinear characteristics of the biological neuron shown in FIG. 1C.

The SFA characteristics and the chaotic activity of the artificial neuron device 100 described above are more pronounced in the biological neurons of the mammalian cortex. The artificial neuron device 100 according to an embodiment of the present disclosure shows the Integrate-and-Fire function, the rate coding ability, the SFA characteristic, and the chaotic activity of the biological neurons shown in FIGS. 1A to 1C. For this reason, the artificial neuron device 100 of the present disclosure may be widely used for an artificial neuron network device, a large-scale brain-inspired computing system, an artificial intelligence (AI) system, and the like.

III. Application Example of Artificial Neuron Device

Figure 10:
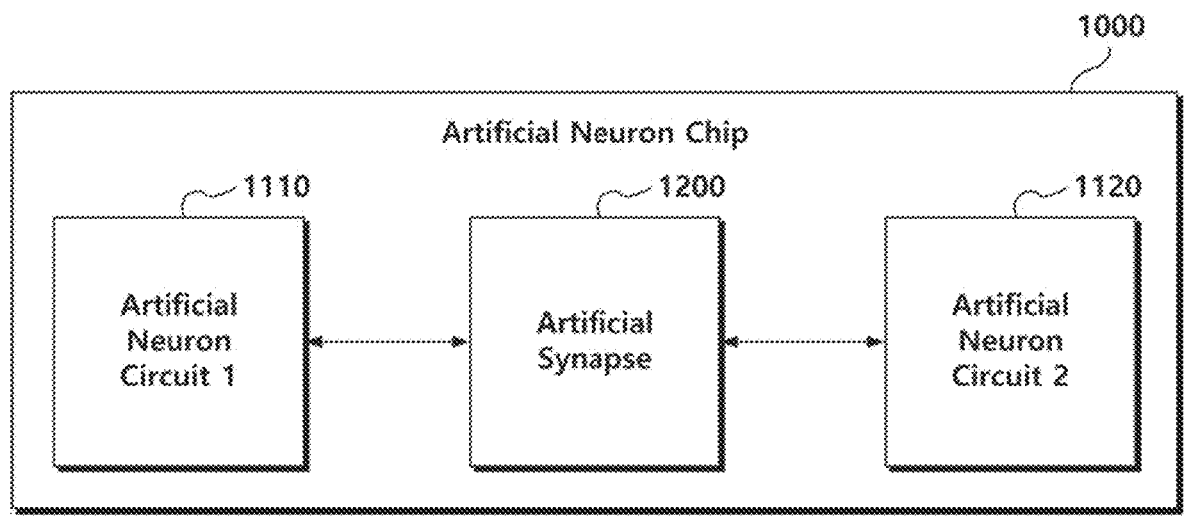
FIG. 10 is a block diagram illustrating an artificial neuron chip including the artificial neuron device shown in FIG. 2.

FIG. 10 is a block diagram illustrating an artificial neuron chip including the artificial neuron device shown in FIG. 2. Referring to FIG. 10, the artificial neuron chip 1000 includes a first artificial neuron device 1110, a second artificial neuron device 1120, and an artificial synapse 1200. The artificial neuron chip 1000 is simply illustrated in FIG. 10 but the artificial synapse 1200 the artificial neuron chip 1000 may be disposed at an intersection of a row line RL extending horizontally from the first artificial neuron device 1110 and a column line CL extending vertically from the second artificial neuron device 1120.

The first artificial neuron device 1110 may transmit an electrical signal to the artificial synapse 1200 through the row line RL. The second artificial neuron device 1120 may receive the electrical signal from the artificial synapse 1200 through the column line CL. Conversely, an electrical signal may be transmitted from the second artificial neuron device 1120 to the first artificial neuron device 1110 via the artificial synapse 1200.

The artificial synapse 1200 may include a variable resistive layer and two electrodes. For example, the artificial synapse 1200 may include a first electrode electrically connected to the first artificial neuron device 1110 and a second electrode electrically connected to the second artificial neuron device 1120. The variable resistive layer of the artificial synapse 1120 may have a multi-resistance level. The variable resistive layer of the artificial synapse 1200 may include at least one of a metal oxide such as transition metal oxides or perovskite group materials, a phase change material such as a chalcogenide group material, a ferroelectric material, or a ferromagnetic material. The artificial synapse 1200 may be changed to a non-conductive state or a conductive state by the number of times electric signal, which is input from the first and second artificial neuron devices 1110, 1120, a time difference of the electric signals of the first and second artificial neuron devices 1110, 1120, and/or a voltage difference of the electric signals of the first and second artificial neuron devices 1110, 1120.

Figure 11:
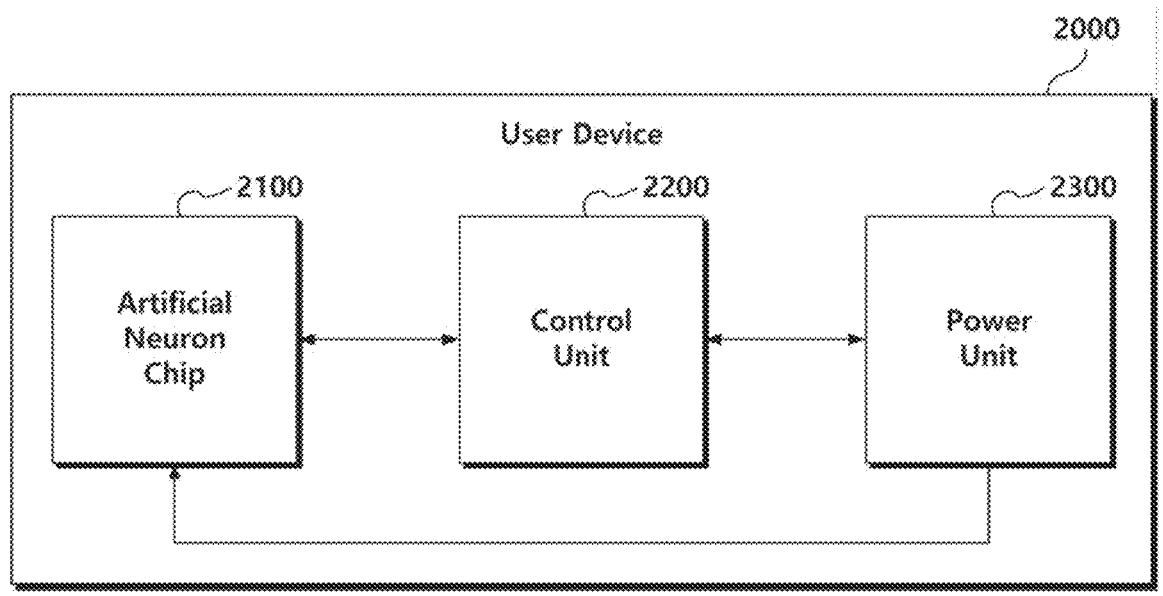
FIG. 11 is a block diagram illustrating a user apparatus including the artificial neuron chip shown in FIG. 10.

FIG. 11 is a block diagram illustrating a user apparatus including the artificial neuron chip shown in FIG. 10. Referring to FIG. 11, the user apparatus 2000 includes an artificial neuron chip 2100, a control unit 2200, and a power source unit 2300. The user apparatus 2000 including the artificial neuron chip 2100 may be used in various applications such as voice recognition and artificial intelligence. The control unit 2200 may include a processing part for controlling operation of the artificial neuron chip 2100, a signal processing part for processing the signal, and a memory part for storing data or driving an algorithm. The power supply unit 2300 may provide power necessary for operation of the artificial neuron chip 2100 and the control unit 2200.

Figure 12:
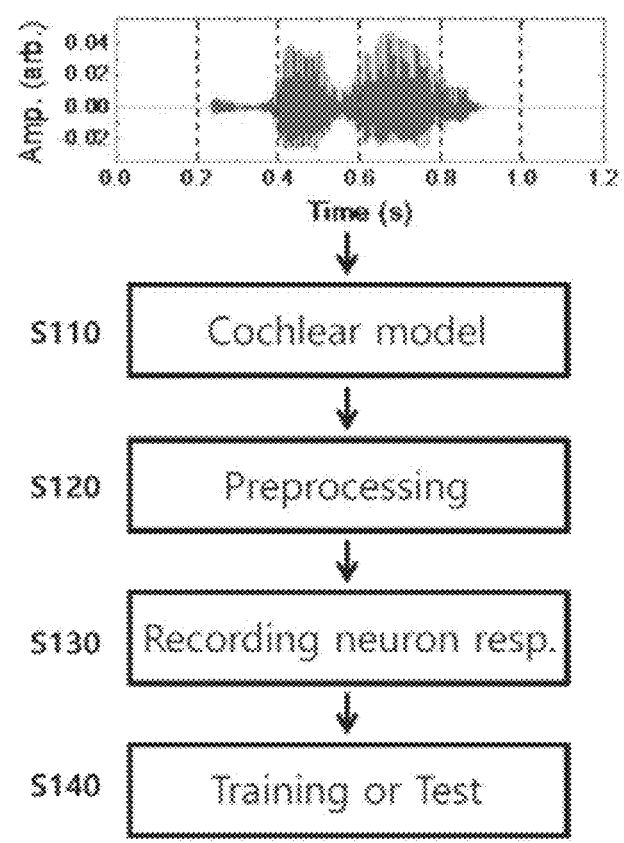
FIGS. 12 and 13 exemplarily illustrate an operation method of a speech recognition apparatus, as which the user apparatus shown in FIG. 11 is used.
Figure 13:
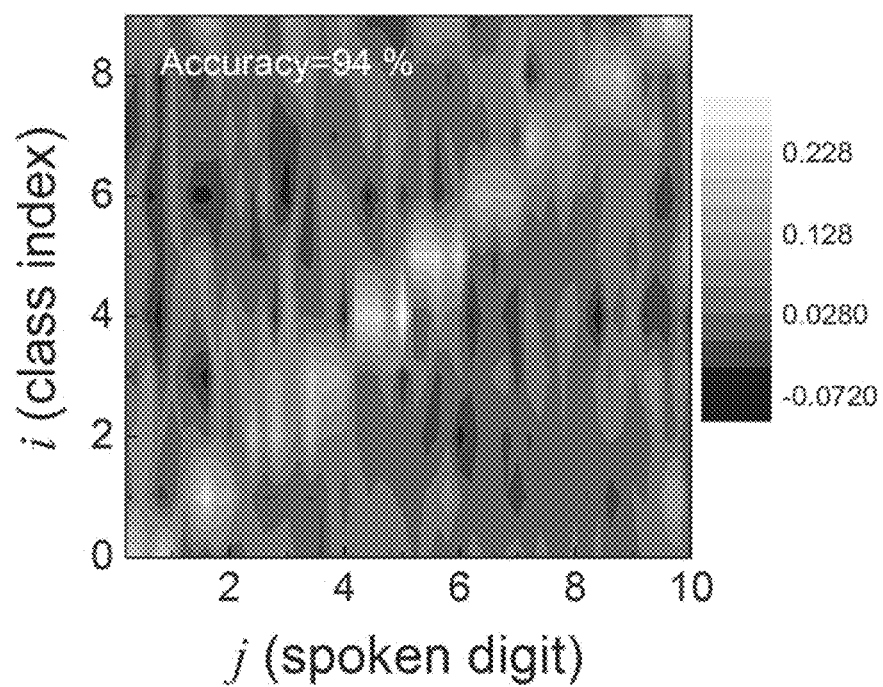

FIGS. 12 and 13 exemplarily illustrate an operation method of a speech recognition apparatus, as which the user apparatus shown in FIG. 11 is used. FIG. 12 is a flowchart illustrating a signal processing method of a voice. The signal processing of the voice may be performed in the control unit 2300 of FIG. 11. Referring to FIG. 12, in step S110, frequency components are obtained based on a cochlear model. In step S120, a pre-processing operation is performed so that the frequency components are applied to the artificial neuron device. In step S130, an operation of providing the pre-processed neuron response to the artificial neuron chip 2100 is performed. In step S140, training and testing operations of the speech recognition using the artificial neuron chip 2100 are performed.

FIG. 13 is a graph illustrating a result of testing accuracy of speech recognition using a speech recognition apparatus. In FIG. 13, a horizontal axis represents the number of spoken-digits, in which a user pronounces from 0 to 9, and a vertical axis represents a class index of a number actually recognized by the speech recognition apparatus. For example, when five people repeat 10 numbers from 0 to 9, 10 times, there are fifty files with the five people pronouncing zero. Likewise, the number of files, in which 1 to 9 are pronounced, is 50 each. A total of 500 voice files are generated. Of these, 450 files (9 files/1 person) may be used for training, and the remaining 50 files may be used for testing. FIG. 13 illustrates a result of measuring accuracy of speech recognition using 50 test files. In FIG. 13, a result of a response to an actual voice is indicated in red. Referring to FIG. 13, the speech recognition apparatus 2000 using the artificial neuron chip 1000 including the artificial neuron device 100 according to the embodiment of the present disclosure may have speech recognition accuracy of 94%.

As described above, the artificial neuron device 100 according to the embodiments of the present disclosure may show the Integrate-and-Fire function, the rate coding ability, the SFA characteristics, and the chaotic activity of the biological neuron, and therefore may be widely used for the artificial neuron network device, the large-scale brain-inspired computing system, and the artificial intelligence (AI) system. In addition, since the artificial neuron device 100 according to the embodiments of the present disclosure is designed to include the threshold switch TS and a small number of passive elements, power consumption may be remarkably reduced compared to the conventional artificial neuron device based on Si-MOSFET.

The above-described description is specific examples for implementing the present invention. The present invention may include, in addition to the above-described embodiments, embodiments that can be simply modified or changed easily. In addition, the present invention will also include techniques that can be easily modified and implemented using the embodiments. Therefore, the scope of the present invention should not be limited to the above-described embodiments, but should be determined by the equivalents of the claims of the present invention as well as the claims of the following.

What is claimed is:

1. An artificial neuron device comprising:
   a first resistor connected between an input terminal and a first node;
   a capacitor connected between the first node and a ground terminal;
   an ovonic threshold switch connected between the first node and a second node, the ovonic threshold switch generating a change in spike current; and
   a second resistor connected between the second node and the ground terminal,
   wherein, when a level of an input voltage applied to the input terminal increases, a region, where a spike frequency of the spike current flowing through the second node increases, occurs.

2. The artificial neuron device of claim 1, wherein, when the input voltage of a constant level is applied to the input terminal according to time, a membrane potential occurs at the first node and the spike current flows through the second node.

3. An artificial neuron device comprising:
   a first resistor connected between an input terminal and a first node;
   a capacitor connected between the first node and a ground terminal;
   an ovonic threshold switch connected between the first node and a second node, the ovonic threshold switch generating a change in spike current; and
   a second resistor connected between the second node and the ground terminal,
   wherein, when a level of an input voltage applied to the input terminal is constant, a Spike-Frequency-Adaptation (SFA) region, where an inter-spike interval of the spike current flowing through the second node increases, exists.

4. The artificial neuron device of claim 3, wherein, when the level of the input voltage applied to the input terminal is constant, an irregular region, where the inter-spike interval of the spike current flowing through the second node has deterministic nonlinear characteristics, exists.

5. The artificial neuron device of claim 4, wherein relative weight of the SFA region and the irregular region changes depending on the values of the first and second resistors and the capacitor.

6. The artificial neuron device of claim 5, wherein the artificial neuron device has a chaotic activity property in the irregular region.

7. The artificial neuron device of claim 1, wherein the ovonic threshold switch includes a top electrode, a threshold switching (TS) material, and a bottom electrode; and
   the TS material includes an oxide including one or more of Nb, Ta, and V.

8. The artificial neuron device of claim 1, wherein the ovonic threshold switch includes a top electrode, a threshold switching (TS) material, and a bottom electrode; and
   the TS material includes a compound including one or more of Se and Te, and one or more of Si, Ge, and As.

9. The artificial neuron device of claim 1, wherein the threshold switch has an on-resistance state or an off-resistance state depending on a threshold voltage (Vth), a holding voltage (Vh), and a previous resistance state.

10. An artificial neuron chip comprising:
    first and second artificial neuron devices; and
    an artificial synapse transmitting an electric signal generated at the first artificial neuron to the second artificial neuron device,
    wherein, the first artificial neuron device includes:
      a first resistor connected between an input terminal and a first node;
      a capacitor connected between the first node and a ground terminal;
      a threshold switch connected between the first node and a second node; and
      a second resistor connected between the second node and the ground terminal,
    wherein, when an input voltage of a constant level is applied to the input terminal according to time, a membrane potential occurs at the first node and a spike current flowing through the second node is provided as the electric signal to the artificial synapse, and
    wherein, when the level of the input voltage applied to the input terminal increases, a region, where a spike frequency of the spike current flowing through the second node increases, occurs.

11. The artificial neuron chip of claim 10, wherein, when the level of the input voltage applied to the input terminal is constant, a Spike-Frequency-Adaptation (SFA) region, where an inter-spike interval of the spike current flowing through the second node increases, exists.

12. The artificial neuron chip of claim 11, wherein, when the level of the input voltage applied to the input terminal is constant, an irregular region, where the inter-spike interval of the spike current flowing through the second node has deterministic nonlinear characteristics, exists.

13. The artificial neuron chip of claim 12, wherein the first artificial neuron device has a chaotic activity property in the irregular region.

14. The artificial neuron chip of claim 10, wherein the threshold switch includes a top electrode, a threshold switching (TS) material, and a bottom electrode; and
    the TS material includes an oxide including one or more of Nb, Ta, and V or a compound including one or more of Se and Te and one or more of Si, Ge, and As.

15. A user apparatus comprising:
an artificial neuron chip of claim 10;
a control unit controlling an operation of the artificial neuron chip; and
a power source unit providing power to the artificial neuron chip and the control unit.

16. The user apparatus of claim 15, wherein, when the level of the input voltage applied to the input terminal is constant, a Spike-Frequency-Adaptation (SFA) region, where an inter-spike interval of the spike current flowing through the second node increases, exists.

17. The user apparatus of claim 16, wherein, when the level of the input voltage applied to the input terminal is constant, an irregular region, where the inter-spike interval of the spike current flowing through the second node has deterministic nonlinear characteristics, exists.

* * * * *